United States Patent
Ma et al.

(10) Patent No.: US 9,483,434 B2
(45) Date of Patent: Nov. 1, 2016

(54) WIRELESS COMMUNICATION DEVICE AND METHOD FOR MANUFACTURING WIRELESS COMMUNICATION DEVICE

(71) Applicant: Huawei Device Co., LTD, Shenzhen (CN)

(72) Inventors: Liang Ma, Shenzhen (CN); Jie Qi, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 818 days.

(21) Appl. No.: 13/895,783

(22) Filed: May 16, 2013

(65) Prior Publication Data

US 2013/0318273 A1 Nov. 28, 2013

(30) Foreign Application Priority Data

May 16, 2012 (CN) .......................... 2012 1 0152066

(51) Int. Cl.
*G06F 13/40* (2006.01)
*G06F 17/50* (2006.01)
(Continued)

(52) U.S. Cl.
CPC ........ *G06F 13/4068* (2013.01); *H01Q 1/2275* (2013.01); *H01Q 1/38* (2013.01); *H01Q 1/48* (2013.01); *H01Q 23/00* (2013.01); *G06F 1/16* (2013.01)

(58) Field of Classification Search
CPC ........... G06F 13/4068; G06F 17/5054; H01L 2924/00; H01L 2924/3025
See application file for complete search history.

(56) References Cited

U.S. PATENT DOCUMENTS 7,824,227 B1* 11/2010 Lee .................... H01R 13/6658
439/660

9,009,381 B2* 4/2015 Kim .................... G06F 13/4072
333/181

(Continued)

FOREIGN PATENT DOCUMENTS

CN 101355794 A 1/2009
CN 101562460 A 10/2009
(Continued)

OTHER PUBLICATIONS

Extended European Search Report received in Application No. 13167800.5-1812, mailed Oct. 2, 2013, 8 pages.
(Continued)

*Primary Examiner* — Henry Tsai
*Assistant Examiner* — Christopher A Daley
(74) *Attorney, Agent, or Firm* — Slater Matsil, LLP

(57) ABSTRACT

The present invention provides a wireless communication device and a method for manufacturing a wireless communication device. The wireless communication device includes: an antenna; a main board, including a ground part, where the ground part is connected to the antenna; at least one matching network, connected to the ground part; a USB connector, including a shell and at least one first pin extending from the shell, where the at least one first pin is connected to the at least one matching network, and at least one first pin is one-to-one corresponding to at least one matching network. According to the present invention, a matching network may be connected between a pin of the USB connector of the wireless communication device and the ground part of the main board, and is configured to control wireless performance of an antenna radiation system of the wireless communication device.

10 Claims, 6 Drawing Sheets

(51) Int. Cl.
*H01Q 1/22* (2006.01)
*H01Q 1/38* (2006.01)
*H01Q 1/48* (2006.01)
*H01Q 23/00* (2006.01)
*G06F 1/16* (2006.01)

(56) References Cited

U.S. PATENT DOCUMENTS

| | | | |
|---|---|---|---|
| 2003/0174092 A1* | 9/2003 | Sullivan | H01Q 1/243 343/702 |
| 2004/0204027 A1 | 10/2004 | Park et al. | |
| 2005/0181643 A1* | 8/2005 | Brower | H04L 67/02 439/76.1 |
| 2006/0139211 A1* | 6/2006 | Vance | H01Q 9/0421 343/700 MS |
| 2010/0142597 A1* | 6/2010 | Zhang | H01Q 1/2275 375/219 |
| 2010/0315297 A1* | 12/2010 | Wu | H01Q 1/2275 343/702 |
| 2011/0122035 A1* | 5/2011 | Montgomery | H01Q 1/2291 343/727 |
| 2011/0187623 A1* | 8/2011 | Kim | H01Q 1/244 343/880 |
| 2011/0263217 A1 | 10/2011 | Chiu et al. | |
| 2011/0309993 A1* | 12/2011 | He | H01Q 1/38 343/860 |
| 2012/0003944 A1 | 1/2012 | Bai | |
| 2012/0056795 A1* | 3/2012 | Nagumo | H01P 5/02 343/787 |
| 2012/0196652 A1* | 8/2012 | Lee | H04M 1/0277 455/557 |
| 2013/0040712 A1 | 2/2013 | Nagano | |
| 2013/0050026 A1* | 2/2013 | Vin | H01Q 1/22 343/700 MS |
| 2013/0050049 A1 | 2/2013 | Liu et al. | |

FOREIGN PATENT DOCUMENTS

| | | |
|---|---|---|
| CN | 101867385 A | 10/2010 |
| EP | 2552028 A1 | 1/2013 |
| JP | 2002016418 A | 1/2002 |
| JP | 2006294349 A | 10/2006 |
| JP | 2008526165 A | 7/2008 |
| WO | 2011135851 A1 | 11/2011 |
| WO | 2011160543 A1 | 12/2011 |

OTHER PUBLICATIONS

International Search Report received on Application No. PCT/CN2013/075708, mailed Aug. 22, 2013, 11 pages.

Notice of Reasons for Rejection received in Application No. 2013-102904 mailed Mar. 11, 2014, 6 pages.

* cited by examiner

WIRELESS COMMUNICATION DEVICE AND METHOD FOR MANUFACTURING WIRELESS COMMUNICATION DEVICE

CROSS-REFERENCE TO RELATED APPLICATIONS

This application claims priority to Chinese Patent Application No. 201210152066.3, filed on May 16, 2012, which is hereby incorporated by reference in its entirety.

TECHNICAL FIELD

The present invention relates to the communication field, and in particular, to a wireless communication device and a method for manufacturing a wireless communication device.

BACKGROUND

With the development of communication technologies, various wireless communication devices are widely applied increasingly. Wireless performance, for example, a total radiation power (Total Radiation Power, TRP) and total isotropic sensitivity (Total Isotropic Sensitivity, TIS), is used as an important indicator for measuring a wireless communication device. How to ensure that the wireless communication device can exert good wireless performance in various application scenarios is a major challenge for current research.

In a wireless communication device having an inline universal series bus (Universal Series Bus, USB) connector, two pins extending from a metal shell of the USB connector is directly welded to a ground part of a printed circuit board (Printed Circuit Board, PCB), namely, a main board, of the wireless communication device, thereby being connected to the main board. The PCB main board of the wireless communication device is connected, through the USB connector, to another terminal device (for example, a computer and a charger) having a USB socket, and starts to work after being powered on.

Because a difference in wireless performance of the wireless communication device on different terminal devices having a USB socket is large, an existing solution cannot ensure that the wireless communication device has good wireless performance when accessing different terminal devices having a USB socket.

SUMMARY

The present invention provides a wireless communication device and a method for manufacturing a wireless communication device, where the wireless communication device has good wireless performance on different terminal devices having a USB socket.

In one aspect, a wireless communication device is provided and includes: an antenna; a main board, including a ground part, where the ground part is connected to the antenna; at least one matching network, connected to the ground part; a USB connector, including a shell and at least one first pin extending from the shell, where the at least one first pin is connected to the at least one matching network, and at least one first pin is one-to-one corresponding to at least one matching network.

In another aspect, a method for manufacturing a wireless communication device is provided and includes: forming a main board including a ground part; connecting the ground part and an antenna; connecting at least one matching network between the ground part and at least one first pin extending from a shell of a USB connector, where the at least one matching network is one-to-one corresponding to the at least one first pin.

In the technical solutions, a matching network may be connected between a pin of a USB connector of a wireless communication device and a ground part of a main board, and is configured to control distribution of a surface current excited by an antenna on the main board of the wireless communication device, so as to control wireless performance of an antenna radiation system of the wireless communication device, and reduce a difference in wireless performance between different terminal devices having a USB socket, thereby ensuring that the wireless communication device has good wireless performance when accessing different terminal devices.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and persons of ordinary skill in the art may further obtain other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

It should be understood that, a wireless communication device may include a wireless communication device having an inline USB connector, for example, a data card, a 3G wireless network card (such as a 3G Dongle network card), a USB wireless network card, and Mobile WiFi. A terminal device may be a device having a UBS socket, for example, a computer and a charger.

A PCB, namely, a main board, of the wireless communication device (or referred to as a wireless USB device for short) having an inline USB connector is small, an entire antenna radiation system may be formed by an antenna, a ground part of the PCB, namely, the main board, and a ground part of a terminal device that is connected through a USB connector. Because a physical size of the ground part of the terminal device that the wireless communication device accesses is different, wireless performance of the entire antenna radiation system is caused to be inconsistent, for example, a TRP of the wireless communication device when being inserted in a computer is significantly higher than that when being inserted in a charger.

According to the embodiments of the present invention, wireless performance of a wireless communication device having an inline USB connector when being used in different scenarios (or on different devices) can be improved.

Figure 1:
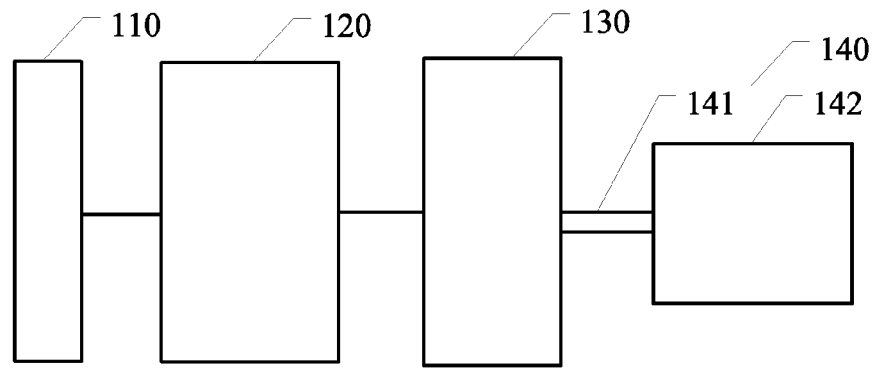
FIG. 1 is a schematic structural diagram of a wireless communication device according to a first embodiment of the present invention.

FIG. 1 is a schematic structural diagram of a wireless communication device 100 according to a first embodiment of the present invention.

The wireless communication device 100 includes: an antenna 110, a main board 120, at least one matching network 130 and a USB connector 140.

The main board 120 includes a ground part, where the ground part is connected to the antenna 110; the at least one matching network 130 is connected to the ground part; the USB connector 140 includes a shell 142 and at least one first pin 141 extending from the shell 142, where the at least one first pin 141 is connected to the at least one matching network 130, and the at least one first pin is one-to-one corresponding to the at least one matching network.

For example, the main board 120 may be a PCB, and the PCB may be a single layer board, a double layer board or a multiple layer board, where each layer of the single layer board, the double layer board or the multiple layer board may be formed by a dielectric layer and a conductive material (for example, an aluminum foil or a copper foil) coated on the dielectric layer or in the dielectric layer. The ground part may be printed on a dielectric layer of the PCB or in a dielectric layer of the PCB, and is made of a conductive material (for example, aluminum or copper), for example, the ground part may be a ground line formed along an edge of the PCB, and is configured to connect to a ground of an electronic device on the PCB. It should be understood that, the ground part in FIG. 1 is merely a schematic diagram, the ground part may have any shape, and a width of the ground part may also be any value. The matching network 130 is disposed between the ground part of the main board 120 and the pin 141 of the USB connector 140. For example, the first pin 141 may be integrated with the shell 142, that is, the first pin 141 is also made of a metal material, and may be electrically connected to the matching network 130. The at least one first pin 141 may be connected to the at least one matching network 130 in a one-to-one corresponding manner, and the number of the at least one matching network 130 is the same as the number of the at least one first pin 141. The matching network 130 may be electrically connected to the ground part. A manner of an electrical connection according to the present invention may be welding, and may also be an electrical connection through a fastening device, such as a bolt and a nut.

In this embodiment, when the wireless communication device 100 is connected to a USB socket of a terminal device (for example, a computer or a charger) through the USB connector 140, the terminal device is equivalent to a ground end, and in this way, the antenna 110, the ground part of the main board 120, the matching network 130, the USB connector 140 and the terminal device form a ground circuit of the wireless communication device 100.

The matching network 130 is configured to control distribution of a surface current excited by an antenna radiation system (which may refers to an antenna radiation system formed by the antenna 110, the ground part of the main board 120, the matching network 130, the USB connector 140 and a ground part of the terminal device that is connected through a USB connector) on the main board 120 of the wireless communication device 100. The surface current excited by the antenna radiation system reaches, through the main board 120, the matching network 130 and the USB connector 140, the terminal device serving as the ground end. Because the matching network 130 may control the distribution of the surface current excited by the antenna radiation system, in designing the wireless communication device 100, the distribution of the surface current of the antenna radiation system may be changed by adjusting a parameter of the matching network 130. Because wireless performance is related to the surface current, setting of the matching network 130 may improve wireless performance of the wireless communication device when the wireless communication device accesses different terminal devices.

According to the embodiment of the present invention, a matching network may be connected between a pin of a USB connector of a wireless communication device and a ground part of a main board, and is configured to control distribution of a surface current excited by an antenna on the main board of the wireless communication device, so as to control wireless performance of an antenna radiation system of the wireless communication device, and reduce a difference in wireless performance between different terminal devices having a USB socket, thereby ensuring that the wireless communication device has good wireless performance when accessing different terminal devices, so that a user can have similar experience when using the wireless communication on different terminal devices.

Optionally, as another embodiment, the main board 120 further includes: at least one conductive part, where the at least one conductive part is independent of the ground part, and is configured to connect the at least one first pin to the at least one matching network, the at least one conductive part is one-to-one corresponding to the at least one matching network, and the number of the at least one conductive part is equal to the number of the at least one matching network. For example, the at least one first pin is connected to the at least one matching network in a one-to-one corresponding manner, a first conductive part is configured to connect one first pin to a first matching network, and a second conductive part is configured to connect another first pin to a second matching network. In addition, the conductive part is further configured to fix the first pin on the main board.

For example, the ground part and the at least one conductive part may both be fixed on a surface of the dielectric layer of the main board 120, or may both be fixed inside the dielectric layer, or the ground part is fixed on a surface of the dielectric layer of the main board 120 while the at least one conductive part is fixed inside the dielectric layer, or the at least one conductive part is fixed on a surface of the dielectric layer while the ground part is fixed inside the dielectric layer. There is a preset gap between the ground part and the at least one conductive part, and the ground part and the at least one conductive part are electrically connected through the at least one matching network. In other words, the at least one first matching network is one-to-one corresponding to the at least one first conductive part, for example, the first matching network is connected between the first conductive part and the ground part, and the second matching network is connected between the second conductive part and the ground part. An edge which is of the ground part and faces the at least one conductive part may have various shapes, for example, may have a line shape or an arc shape, where designing the edge which is of the ground part and faces the at least one conductive part to have an arc shape may avoid occurrence of point discharge. According to the embodiment of the present invention, a topological form and a model of a matching device in the matching network that spans between the ground part of the main board 120 and the conductive part of the main board 120 are not limited.

Optionally, as another embodiment, the main board 120 further includes a conductive part, where the conductive part is independent of the ground part, and is configured to connect the at least one first pin to the at least one matching network.

For example, according to the embodiment of the present invention, two matching networks may also be connected to two first pins through one conductive part respectively.

Figure 3:
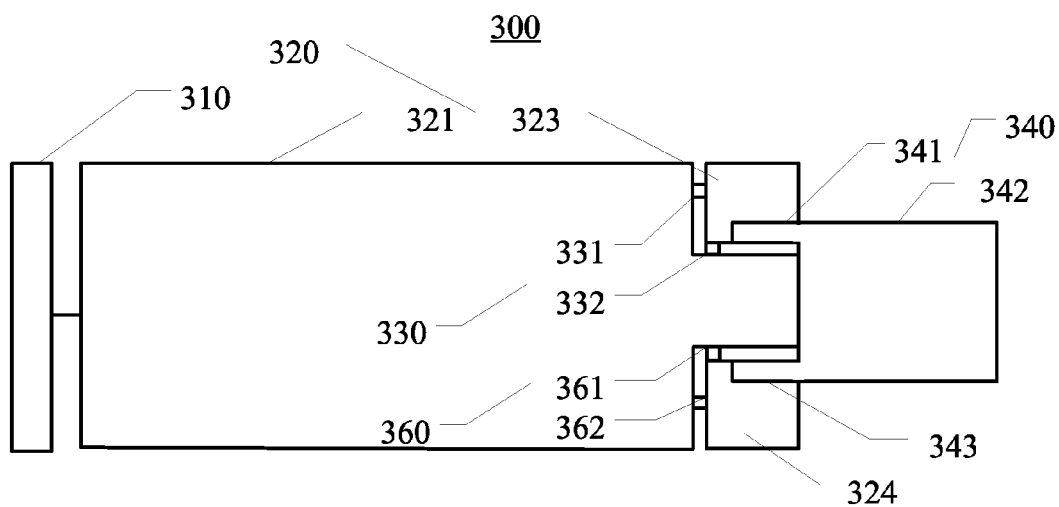
FIG. 3 is a schematic structural diagram of a wireless communication device according to a third embodiment of the present invention.
Figure 10:
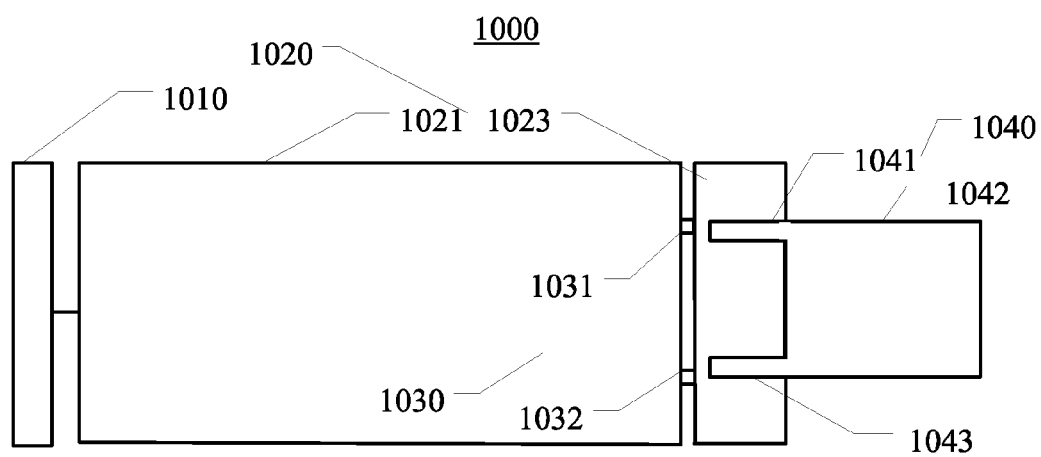
FIG. 10 is a schematic structural diagram of a wireless communication device according to an eleventh embodiment of the present invention.

FIG. 10 is a schematic structural diagram of a wireless communication device 1000 according to a tenth embodiment of the present invention. The embodiment in FIG. 10 is an example of the embodiment in FIG. 1. What is different from the embodiment in FIG. 3 is that two pins of a USB connector of the wireless communication device 1000 in FIG. 10 are connected to a matching network through one conductive part.

The wireless communication device 1000 in FIG. 10 may include an antenna 1010, a main board 1020, a matching network 1030 and a USB connector 1040. The main board 1020 may include a ground part 1021, a conductive part 1023 and a dielectric layer (not shown). The USB connector 1040 includes a metal shell 1042, a pin 1041 and a pin 1043.

Two ends of the matching network 1030 (including two parts, namely, 1031 and 1032, in FIG. 10) are connected in series to the ground part 1021 and the conductive part 1023, respectively. For example, the matching network 1030 is connected between a first edge of the conductive part 1023 and a first edge of the ground part 1021, where the first edge of the conductive part 1023 and the first edge of the ground part 1021 are adjacent to each other, and there is a preset interval between the first edge of the conductive part 1023 and the first edge of the ground part 1021.

Optionally, as another embodiment, the USB connector 140 further includes at least one second pin extending from the shell, where the at least one second pin is directly connected to the ground part. It can be understood that, the USB connector 140 in the embodiment of the present invention may include at least two pins. When the USB connector 140 includes more than two pins, the number of second pins may be 2 or more.

For example, the second pin may be integrated with the shell that is made of a metal material, that is, the second pin is also made of a metal material, and may be electrically connected to the ground part. A manner of an electrical connection according to the present invention may be welding, and may also be an electrical connection through a fastening device, such as a bolt and a nut.

According to the embodiment of the present invention, the matching network is connected to the ground part and the first pin by adopting a physical connection or electrical connection manner.

For example, a physical connection between the ground part and the first pin may be implemented by a lumped-element matching network, or an electrical connection between the ground part and the first pin may be implemented by a distributed matching network.

According to the embodiment of the present invention, the shell may be a metal shell.

Optionally, as another embodiment, the shell may include a conductive part configured to electrically connect the first pin and an external device, and the shell may further include a conductive part configured to electrically connect the second pin and an external device. For example, the shell may be made of plastics, and includes a wire configured to electrically connect the first pin and/or the second pin and an external device.

According to the embodiment of the present invention, the at least one second pin may include one second pin.

According to the embodiment of the present invention, the at least one first pin may include one first pin, the at least one conductive part may include one conductive part, and the at least one matching network may include one matching network.

For example, when the USB connector merely has two pins, one pin may be connected to the ground part through the matching network.

According to the embodiment of the present invention, an edge which is of the conductive part and is adjacent to the ground part and an edge which is of the ground part and is adjacent to the conductive part may have a rectangle shape or an arc shape.

For example, a part which is of the ground part and is located around the pin of the USB connector may be designed to be a rectangular notch or an arc-shaped notch, and it is made that the conductive part is located in the notch, so that the edge which is of the conductive part and is adjacent to the ground part and the edge which is of the ground part and is adjacent to the conductive part have a rectangle shape or an arc shape. For another example, a circular or rectangular opening may be disposed on a part which is of the ground part and is located around the pin of the USB connector, and the conductive part may be located in the circular or rectangular opening. In this case, the pin may span the ground part and be connected to the conductive part in the opening of the ground part, or the pin may span the ground part and be connected to the conductive part in the opening of the ground part through a connection line.

Figure 5:
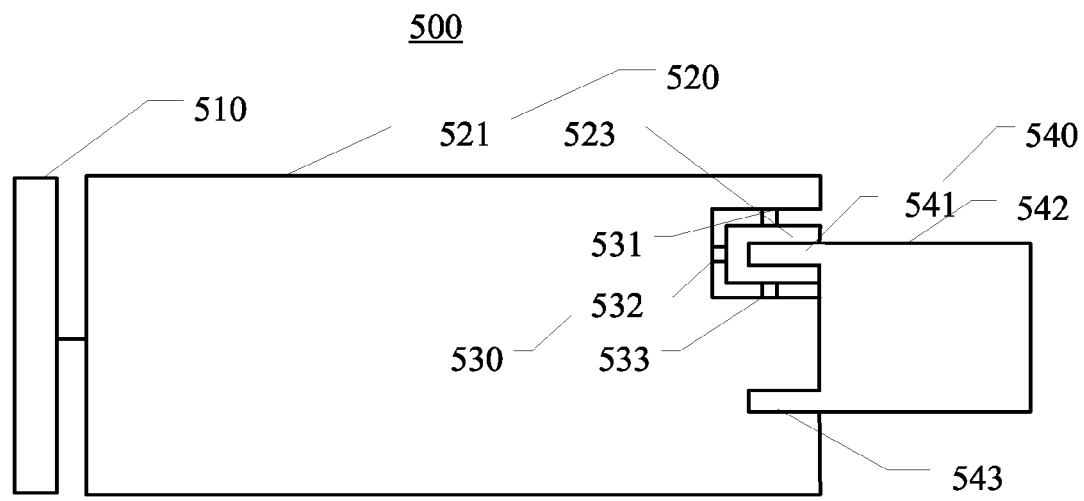
FIG. 5 is a schematic structural diagram of a wireless communication device according to a fifth embodiment of the present invention.
Figure 11:
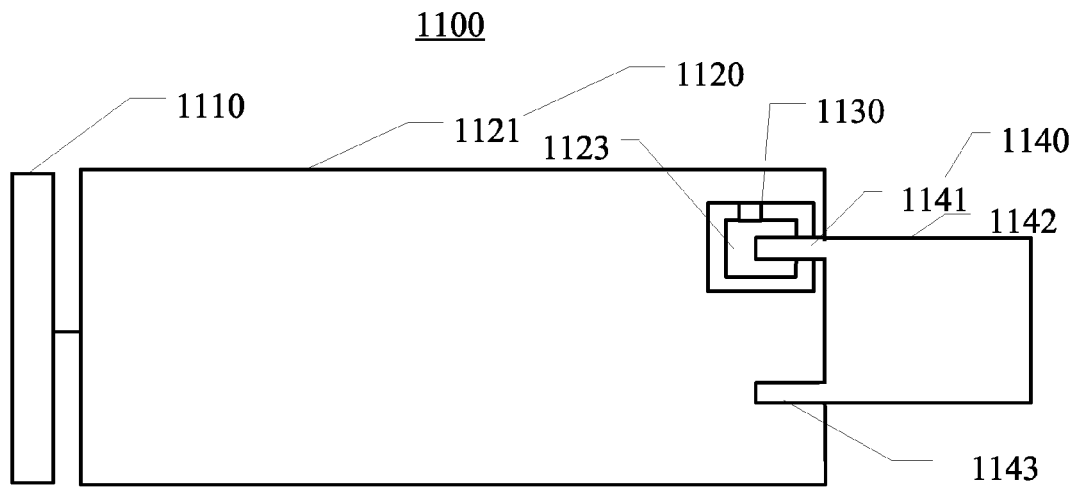
FIG. 11 is a schematic structural diagram of a wireless communication device according to an eleventh embodiment of the present invention.

FIG. 11 is a schematic structural diagram of a wireless communication device 1100 according to an eleventh embodiment of the present invention. The embodiment in FIG. 11 is an example of the embodiment in FIG. 1. What is different from the embodiment in FIG. 5 is that a conductive part of the wireless communication device in FIG. 11 is located in an opening which is of a ground part and is around a USB connector.

The wireless communication device 1100 in FIG. 11 may include an antenna 1110, a main board 1120, a matching network 1130 and a USB connector 1140. The main board 1120 may include a ground part 1121, a conductive part 1123 and a dielectric layer (not shown). The USB connector 1140 includes a metal shell 1142, a pin 1141 and a pin 1143.

The conductive part 1123 is located in the opening of the ground part, there is a preset interval between each edge of the conductive part 1123 and each edge of the opening of the ground part 1121. Two ends of the matching network 1130 are connected in series to the ground part 1121 and the conductive part 1123, respectively. For example, the matching network 1130 is connected between a first edge of the conductive part 1123 and a first edge of the opening of the ground part 1121. In other words, the pin 1141 may span the ground part 1121 and be physically connected to the conductive part 1123 in the opening of the ground part 1121, or the pin may span the ground part 1121 and be physically connected to the conductive part 1123 in the opening of the ground part 1121 through a connection line (not shown). The pin 1143 is directly physically connected to the ground part 1120.

According to the embodiment of the present invention, the matching network includes a lumped-element matching network or a distributed matching network.

For example, the lumped-element matching network may be a resistor, a capacitor or an inductor, or a combination of at least two of a resistor, a capacitor and an inductor. The distributed matching network may be implemented by adopting a direct current disconnection manner, for example, the distributed matching network may be a distributed capacitor formed by a gap between the conductive part and the ground part.

Optionally, as another embodiment, the at least one matching network may include: at least one lumped-element matching network and/or at least one distributed matching network.

For example, when one USB connector has two first pins, one first pin is connected to one lumped-element matching network, and the other first pin is connected to the distributed matching network.

According to the embodiment of the present invention, the at least one conductive part is located at a position where the at least one first pin and the main board overlap, an area of the conductive part is larger than an overlapped area of the first pin and the main board, the conductive part is adjacent to the ground part, the matching network may include at least two parts that are separated from each other, one end of each part of the at least two parts is connected to one end of the conductive part, and the other end is connected to the ground part.

Optionally, the area of the conductive part may also be smaller than the overlapped area of the first pin and the main board as long as the conductive part can perform a function of fixing and electrically connecting to the first pin.

According to the embodiment of the present invention, each lumped-element matching network in the at least one lumped-element matching network includes a matching circuit formed by at least one of a resistor, a capacitor and an inductor.

According to the embodiment of the present invention, the distributed matching network includes a capacitor, and the capacitor is formed by the conductive part, the ground part and a gap between the conductive part and the ground part.

For example, a first gap is formed between a first conductive part and the ground part, and an edge which is of the first conductive part and faces the ground part, an edge which is of the ground part and faces the first conductive part and the first gap form a distributed capacitor, which serves as a first distributed matching network. A second gap is formed between a second conductive part and the ground part, and an edge which is of the second conductive part and faces the ground part, an edge which is of the ground part and faces the second conductive part and the second gap form a distributed capacitor, which serves as a second distributed matching network.

According to the embodiment of the present invention, the antenna is located on the other end which is of the main board and is away from the USB connector, or the antenna is located on the main board.

For example, the antenna may be located at a suitable position as required, for example, the antenna may be located at a tail part which is of the wireless communication device and is opposite to the USB connector, which is not limited according to the embodiment of the present invention. For example, the antenna may also be located on the other surface which is of the main board and is opposite to a surface where the ground part is located.

According to the embodiment of the present invention, a parameter of the at least one matching network is determined by measuring wireless performance of an antenna radiation system including the antenna.

For example, in designing the wireless communication device 100, the parameter of the at least one matching network may be adjusted according to a TRP and/or TIS measured when the wireless communication device 100 is inserted in different terminal devices, so that the wireless communication device can have good wireless performance when accessing different terminal devices having a USB socket.

In the following, a specific process of adjusting the parameter of the matching network is described by taking the TRP as an example. Specifically, the wireless communication device 100 may be inserted in two terminal devices (for example, a computer and a charger) with a large difference in physical sizes for test. For different parameters of the matching network of the wireless communication device 100, a value of a TRP is measured, and when the wireless communication device is inserted in the two terminal devices, a parameter of the matching network when a difference between two TRPs is smaller is selected as a final parameter of the matching network according to a measurement result. That the matching network is a capacitor is taken as an example, in a case that another experimental condition is the same, when the capacitor is 0.5 pF, the foregoing difference is 2.18 dBm, while when the capacitor is 1.8 pF, the foregoing difference is 1.58 dBm; therefore, the capacitor of 1.8 pF when the difference between the TRPs is smaller can be selected as the matching network. It should be understood that, a process of adjusting the parameter of the matching network according to the TIS is similar to the process of adjusting the parameter of the matching network according to the TRP, which is not repeatedly described here.

Optionally, the parameter of the at least one matching network may be designed to be adjustable, so that a user may adjust the parameter of the least one matching network (for example, a resistor and/or a capacitor) as required in a process of using the wireless communication device, for example, the user may adjust resistance of the resistor and/or capacitance of the capacitor, so that the wireless communication device can have good wireless performance when accessing different terminal devices having a USB socket.

Figure 2A:
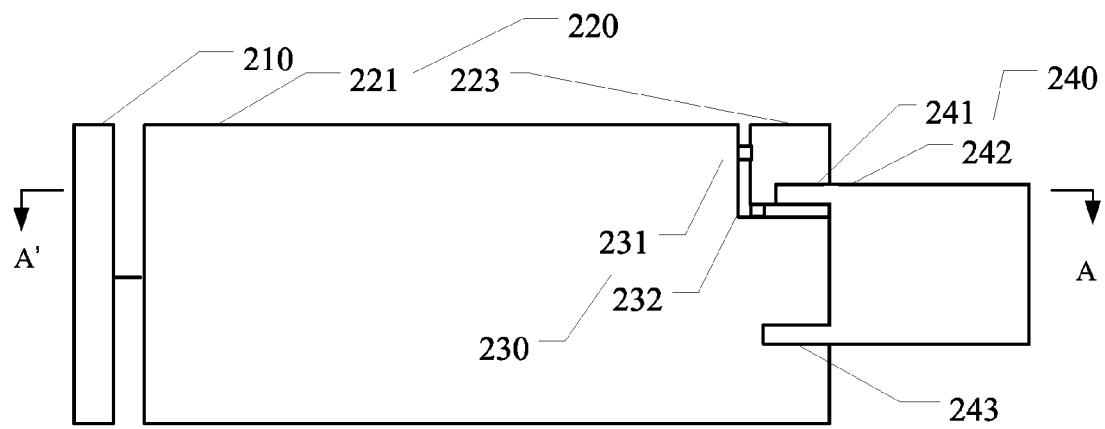
FIG. 2A is a schematic structural diagram of a wireless communication device according to a second embodiment of the present invention.
Figure 2B:
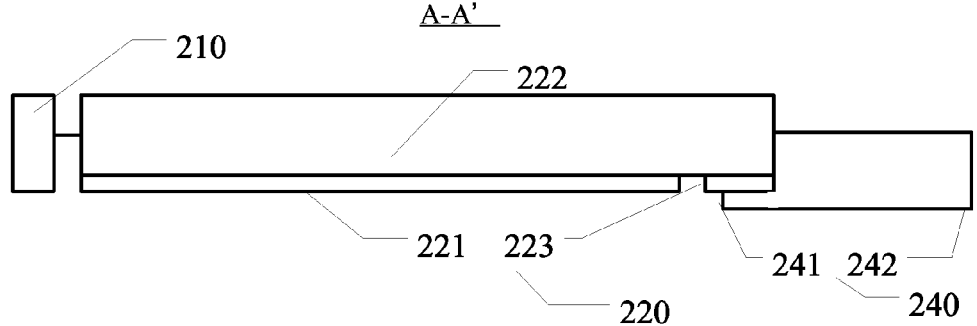
FIG. 2B is a cross-sectional diagram of the wireless communication device observed along a line A-A' according to the second embodiment of the present invention.

FIG. 2A is a schematic structural diagram of a wireless communication device 200 according to a second embodiment of the present invention. FIG. 2B is a cross-sectional diagram of the wireless communication device 200 observed along a line A-A' according to the second embodiment of the present invention. The embodiment in FIG. 2A and FIG. 2B is an example of the embodiment in FIG. 1.

The wireless communication device 200 may include an antenna 210, a main board 220, a matching network 230 and a USB connector 240.

The main board 220 may include a ground part 221, a dielectric layer 222 and a conductive part 223. The ground part 221 and the conductive part 223 are fixed on the dielectric layer 222. The conductive part 223 is adjacent to the ground part 221, for example, the conductive part 223 may be located in a notch formed at an edge of the ground part 221, at least one edge (for example, two edges) of the conductive part 223 is adjacent to the ground part 221, there is a preset interval between the at least one edge of the conductive part 223 and the ground part 221, and the interval may be an air gap, and may also be filled with a non-conductive medium, for example, filled with a material same as a material of the dielectric layer 222, and a distance of the preset interval is not limited according to the embodiment of the present invention as long as the preset interval can perform a function of disconnecting a direct current. The notch of the ground part 221 have a rectangle shape, and correspondingly, the conductive part 223 also has a rectangle shape.

Two ends of the matching network 230 are connected to the ground part 221 and the conductive part 223, respectively. The matching network 230 may include a first part 231 and a second part 232, where the first part 231 is connected between a first edge of the conductive part 223 and a first edge of the notch of the ground part 221, and the second part 232 is connected between a second edge of the conductive part 223 and a second end of the notch of the ground part 221. The matching network 230 may be a lumped-element matching network, for example, the matching network 230 may be a matching circuit formed by at least one of a resistor, a capacitor and an inductor.

The USB connector 240 may include a metal shell 242 and a pin 241 and a pin 243 extending from the metal shell 242. The pin 241 is fixed (for example, welded) to the conductive part 223. An area of the conductive part 223 is larger than an area of the pin 241, which is not limited according to the embodiment of the present invention, and the area of the conductive part 223 may also be smaller than or equal to the area of the pin 241. The pin 243 may be directly fixed (for example, welded) to the ground part 221.

The antenna 210 is connected to a side which is of the ground part 220 and is away from the USB connector 240.

In this embodiment, when the wireless communication device 200 is connected to a terminal device (for example, a computer or a charger) through the USB connector 240, the terminal device is equivalent to a ground end, so that the antenna 210, the ground part 220 of the main board, the matching network 230, and the isolated conductive part 223 of the main board, the USB connector 240 and the terminal device form a ground circuit of the wireless communication device. In this way, a surface current excited by an antenna radiation system reaches the terminal device serving as the ground end through the ground part of the main board. The matching network connected between the ground part of the main board and the isolated conductive part may control distribution of the surface current excited by the antenna radiation system on the main board, thereby controlling wireless performance of the wireless radiation system, so that the wireless communication device has good wireless performance when accessing different terminal devices having a USB socket.

FIG. 3 is a schematic structural diagram of a wireless communication device 300 according to a third embodiment of the present invention. The embodiment in FIG. 3 is an example of the embodiment in FIG. 1. What is different from the example in FIG. 2 is that in the example in FIG. 3, two pins of a USB connector are connected to two matching networks through two conductive parts respectively, so detailed description is appropriately omitted here.

The wireless communication device 300 may include an antenna 310, a main board 320, a first matching network 330, a second matching network 360 and a USB connector 340.

The main board 320 may include a ground part 321, a dielectric layer (not shown), a first conductive part 323 and a second conductive part 324. The ground part 321, the first conductive part 323 and the second conductive part 324 are all fixed on the dielectric layer. The first conductive part 323 and the second conductive part 324 are adjacent to the ground part 321, for example, the first conductive part 323 and the second conductive part 324 may be located in two notches formed at an edge of the ground part 321 respectively, at least one edge (for example, two edges) of the first conductive part 323 is adjacent to the ground part 321, and there is a preset interval between the at least one edge of the first conductive part 323 and the ground part 321. Similarly, at least one edge (for example, two edges) of the second conductive part 324 is adjacent to the ground part 321, and there is an interval between the at least one edge of the second conductive part 324 and the ground part 321.

Two ends of the first matching network 330 are connected to the ground part 321 and the first conductive part 323, respectively, and two ends of the second matching network 360 are connected to the ground part 321 and the second conductive part 324, respectively. The first matching network 330 includes a first part 331 and a second part 332. The second matching network 360 includes a first part 361 and a second part 362. The first part 331 is connected between a first edge of the first conductive part 323 and a first edge of a first notch of the ground part 321, and the second part 332 is connected between a second edge of the first conductive part 323 and a second edge of the first notch of the ground part 321. Similarly, the first part 361 is connected between a first edge of the second conductive part 324 and a first edge of a second notch of the ground part 321, and the second part 362 is connected between a second edge of the second conductive part 324 and a second edge of the second notch of the ground part 321. The first matching network 330 and the second matching network 360 may be a lumped-element matching network, for example, the matching network may be a matching circuit formed by at least one of a resistor, a capacitor and an inductor.

The USB connector 340 may include a metal shell 342 and a pin 341 and a pin 343 extending from the metal shell 342. The pin 341 is fixed to the first conductive part 323, and an area of the conductive part 323 is larger than an area of the pin 341. The pin 343 is fixed to the second conductive part 324, and an area of the conductive part 324 is larger than an area of the pin 343. The pin 341 and the pin 343 may be directly fixed (for example, welded) to the ground part 321.

The antenna 310 is connected to a side which is of the ground part 320 and is away from the USB connector 340.

In this embodiment, when the wireless communication device 300 is connected to a terminal device (for example, a computer or a charger) through the USB connector 340, the terminal device is equivalent to a ground end, so that antenna 310, the ground part 320 of the main board, the first matching network 330, the second matching network 360, the first conductive part 323 of the main board, the second conductive part 324, the USB connector 340 and the terminal device form a ground circuit of the wireless communication device. In this way, a surface current excited by an antenna radiation system reaches the terminal device serving as the ground end through the ground part of the main board.

Figure 4:
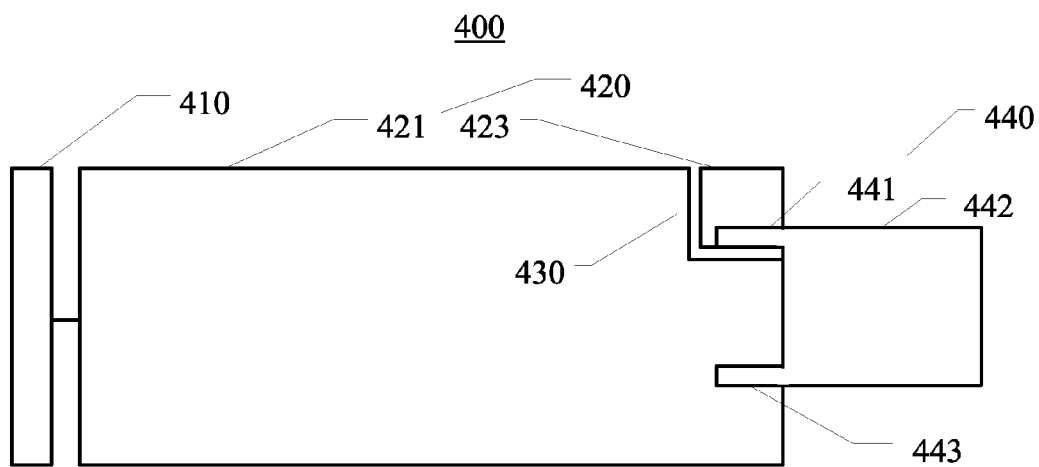
FIG. 4 is a schematic structural diagram of a wireless communication device according to a fourth embodiment of the present invention.

FIG. 4 is a schematic structural diagram of a wireless communication device 400 according to a fourth embodiment of the present invention. The embodiment in FIG. 4 is an example of the embodiment in FIG. 1. What is different from the example in FIG. 2 is that a matching network 430 in the example in FIG. 4 is implemented by a distributed capacitor, so detailed description is appropriately omitted here.

The wireless communication device 400 may include an antenna 410, a main board 420, a matching network 430 and a USB connector 440. The main board 420 may include a ground part 421, a conductive part 423 and a dielectric layer (not shown). The USB connector 440 includes a metal shell 442, a pin 441 and a pin 443.

There is a gap between the conductive part 423 and the ground part 421, that is, a direct current disconnect form is adopted. In other words, the matching network 430 is formed by a distributed capacitor formed by a gap between the conductive part 423 and the ground part 421.

FIG. 5 is a schematic structural diagram of a wireless communication device 500 according to a fifth embodiment of the present invention. The embodiment in FIG. 5 is an example of the embodiment in FIG. 1. What is different from the example in FIG. 2 is that a conductive part in the example in FIG. 5 is adjacent to a ground part through three edges, so detailed description is appropriately omitted here.

The wireless communication device 500 may include an antenna 510, a main board 520, a matching network 530 and a USB connector 540. The main board 520 may include a ground part 521, a conductive part 523 and a dielectric layer (not shown). The USB connector 540 includes a metal shell 542, a pin 541 and a pin 543.

Two ends of the matching network 530 are connected to the ground part 521 and the conductive part 523, respectively. The matching network 530 may include a first part 531, a second part 532 and a third part 533, where the first part 531 is connected between a first edge of the conductive part 523 and a first edge of a notch of the ground part 521, the second part 532 is connected between a second edge of the conductive part 523 and a second edge of the notch of the ground part 521, and the third part 533 is connected between a third edge of the conductive part 523 and a third edge of the notch of the ground part 521.

Figure 6:
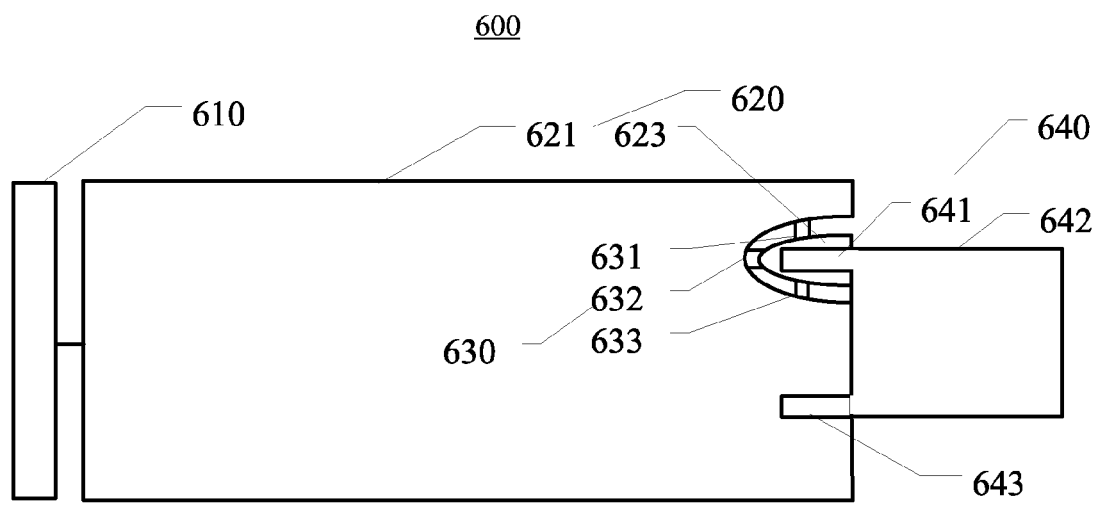
FIG. 6 is a schematic structural diagram of a wireless communication device according to a sixth embodiment of the present invention.

FIG. 6 is a schematic structural diagram of a wireless communication device 600 according to a sixth embodiment of the present invention.

The embodiment in FIG. 6 is an example of the embodiment in FIG. 1. What is different from the example in FIG. 5 is that a notch of a ground part in the example in FIG. 6 has a semi-elliptical shape, and correspondingly, a conductive part also has a semi-ellipse shape, so detailed description is appropriately omitted here.

The wireless communication device 600 may include an antenna 610, a main board 620, a matching network 630 and a USB connector 640. The main board 620 may include a ground part 621, a conductive part 623 and a dielectric layer (not shown). The USB connector 640 includes a metal shell 642, a pin 641 and a pin 643.

Two ends of the matching network 630 are connected to the ground part 621 and the conductive part 623, respectively. The matching network 630 may include a first part 631, a second part 632 and a third part 633, where the first part 631, the second part 632 and the third part 633 are connected between an elliptical shape edge of a notch of the ground part 621 and an elliptical edge of the conductive part 623 at a preset interval. Although the matching network 630 in this embodiment may be divided into three parts, which is not limited according to the embodiment of the present invention, for example, the matching network 630 may include one part, or two parts, or more parts.

Figure 7:
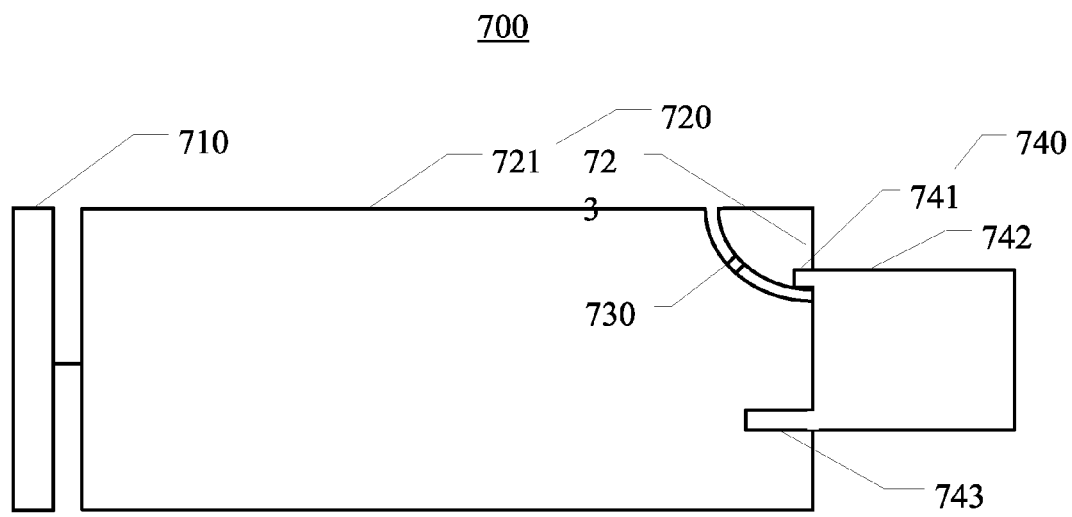
FIG. 7 is a schematic structural diagram of a wireless communication device according to a seventh embodiment of the present invention.

FIG. 7 is a schematic structural diagram of a wireless communication device 700 according to a seventh embodiment of the present invention.

The embodiment in FIG. 7 is an example of the embodiment in FIG. 1. What is different from the example in FIG. 2 is that a conductive part in the example in FIG. 7 has a sector shape, and an edge which is of the conductive part and has an arc shape is adjacent to a ground part, so detailed description is appropriately omitted here.

The wireless communication device 700 may include an antenna 710, a main board 720, a matching network 730 and a USB connector 740. The main board 720 may include a ground part 721, a conductive part 723 and a dielectric layer (not shown). The USB connector 740 includes a metal shell 742, a pin 741 and a pin 743.

The matching network 730 may be connected between the ground part 721 and the conductive part 723, and an edge which is of the ground part 721 and is adjacent to the conductive part 723 has an arc shape, and an edge which is of the conductive part 723 and is adjacent to the ground part 721 has an arc shape, for example, the conductive part has a sector shape. Correspondingly, an edge of a notch of the ground part also has an arc shape. The matching network 730 may include at least one part, and each part of the matching network 730 may be disposed at a certain interval.

Figure 8:
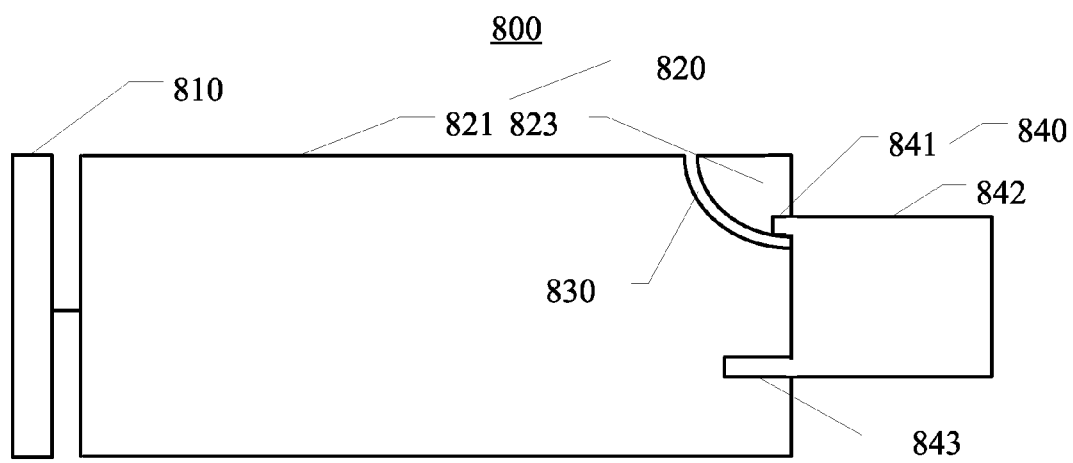
FIG. 8 is a schematic structural diagram of a wireless communication device according to an eighth embodiment of the present invention.

FIG. 8 is a schematic structural diagram of a wireless communication device 800 according to an eighth embodiment of the present invention. The embodiment in FIG. 8 is an example of the embodiment in FIG. 1. What is different from the example in FIG. 7 is that a matching network in the example in FIG. 8 is implemented by a distributed capacitor, so detailed description is appropriately omitted here.

The wireless communication device 800 may include an antenna 810, a main board 820, a matching network 830 and a USB connector 840. The main board 820 may include a ground part 821, a conductive part 823 and a dielectric layer (not shown). The USB connector 840 includes a metal shell 842, a pin 841 and a pin 843.

There is a gap between the conductive part 823 and the ground part 821, and a direct current disconnect form is adopted. In other words, the matching network 830 is a distributed capacitor formed by a gap between the conductive part 823 and the ground part 821.

Figure 9:
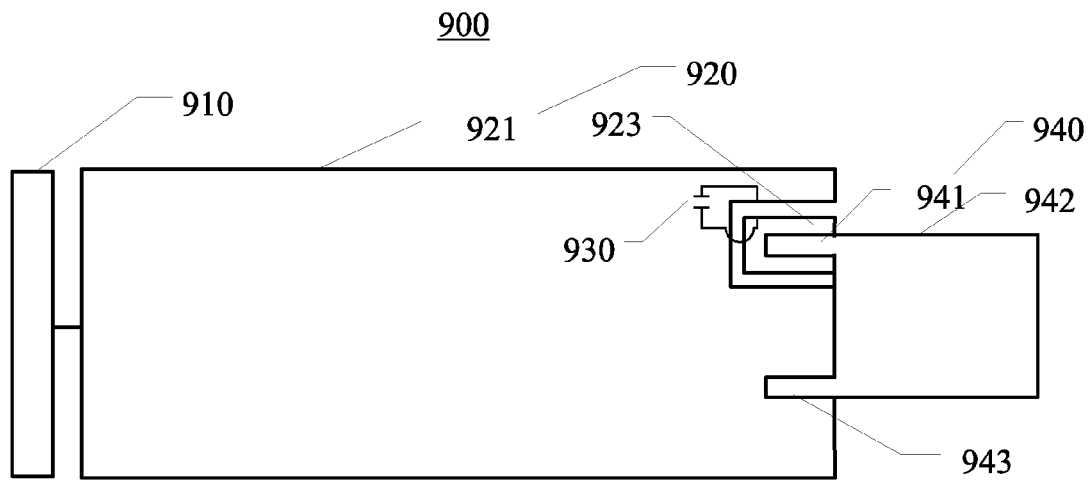
FIG. 9 is a schematic structural diagram of a wireless communication device according to a ninth embodiment of the present invention.

FIG. 9 is a schematic structural diagram of a wireless communication device 900 according to a ninth embodiment of the present invention. The embodiment in FIG. 9 is an example of the embodiment in FIG. 1. What is different from the example in FIG. 5 is that a matching network in the example in FIG. 9 is implemented by a capacitor 930, so detailed description is appropriately omitted here.

The wireless communication device 900 may include an antenna 910, a main board 920, a matching network 930 and a USB connector 940. The main board 920 may include a ground part 921, a conductive part 923 and a dielectric layer (not shown). The USB connector 940 includes a metal shell 942, a pin 941 and a pin 943.

Two ends of the capacitor 930 are connected in series to the ground part 921 and the conductive part 923, respectively. For example, the capacitor 930 is connected between a first edge of the conductive part 923 and a first edge of a notch of the ground part 921, where the first edge of the conductive part 923 is adjacent to the first edge of the notch of the ground part 921, and there is a preset interval exists between the first edge of the conductive part 923 and the first edge of the notch of the ground part 921.

In order to further describe the technical effects of the embodiment of the present invention, a TRP test is performed by taking the embodiment in FIG. 9 as an example. Specifically, the wireless communication device 900 is inserted in a USB socket of a computer and a charger to perform the TRP test on the wireless communication device 900. A test frequency band is a CDMA cellular frequency band, a test frequency is selected to be 824.70 MHz, 836.52 MHz and 848.31 MHz, and capacitance of the capacitor 930 is selected to be 0.5 pF, 1.2 pF, 1.5 pF and 1.8 pF. Test results show that, the greater the capacitance of the capacitor 930 is, the smaller a difference between a TRP when the wireless communication device 900 is connected to the computer and a TRP when the wireless communication device 900 is connected to the charger is. When the capacitance is greater than 1.8 pF, with the increase of the capacitance, a change in a difference between a TRP when the wireless communication device 900 is connected to the computer and a TRP when the wireless communication device 900 is connected to the charger is not significant. Therefore, during selection of the capacitor 930, capacitance is preferably in a range of 0.5 to 1.8 pF, especially 1.8 pF, to which, definitely, a value of the capacitor in the embodiment of the present invention is not limited, and capacitance may also be greater than 1.8 pF or smaller than 0.5 pF. In addition, compared with a solution in which two pins of the USB connector are directly connected to the ground part of the main board, when the wireless communication device 900 is connected to the charger, a TRP of an antenna radiation system is improved, for example, under a same experimental condition, a measured TRP of an antenna radiation system of a conventional wireless communication device is 15.1 dBm, and a measured TRP of an antenna radiation system of the wireless communication device (the matching network of which is a capacitor of 1.8 pF) according to the embodiment of the present invention is 16.57 dBm. When the wireless communication device 900 is connected to the computer, the TRP of the antenna radiation system is not changed significantly (for example, when the conventional wireless communication device and the wireless communication device 900 are connected to the computer, the TRP of the antenna radiation system of the conventional wireless communication device and the TRP according to the embodiment of the present invention are about 18.15 dBm), so that when the wireless communication device 900 is inserted in the two devices, the TRPs of the antenna radiation system are closer. For example, when the conventional wireless communication device is inserted in the computer and the charger, a difference between two TRPs is 3.15 dBm, and when the wireless communication device 900 is inserted in the computer and the charger, a difference between two TRPs is 1.58 dBm, so compared with the difference between the two TRPs of the antenna radiation system of the conventional wireless communication device, the difference between the two TRPs is smaller.

Figure 12:
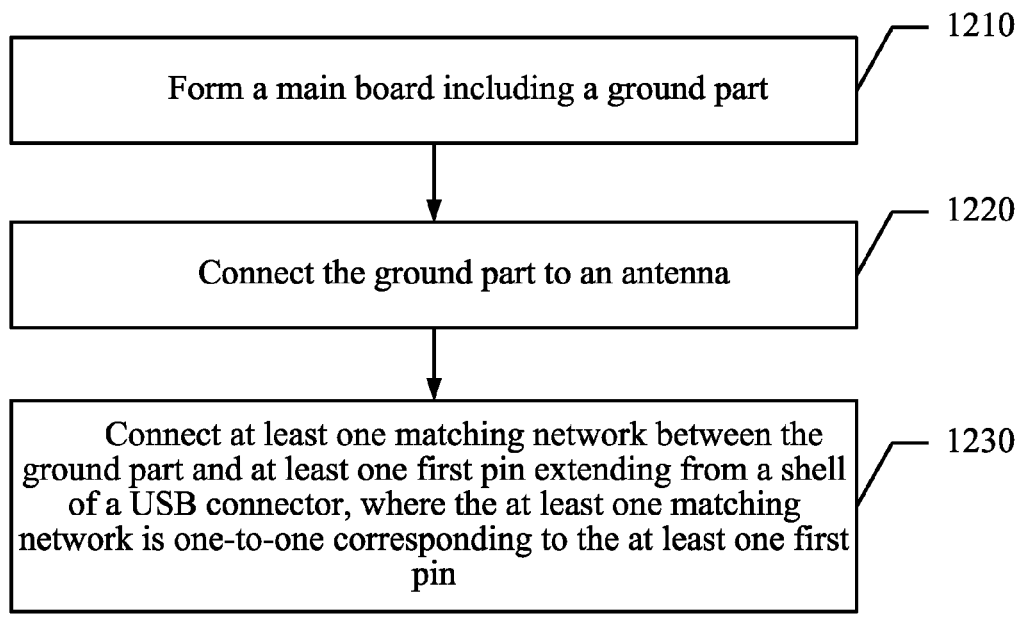
FIG. 12 is a schematic flow chart of a method for manufacturing a wireless communication device according to a twelfth embodiment of the present invention.

FIG. 12 is a schematic flow chart of a method for manufacturing a wireless communication device according to a twelfth embodiment of the present invention.

Step 1210: Form a main board including a ground part.

Step 1220: Connect the ground part to an antenna.

Step 1230: Connect at least one matching network between the ground part and at least one first pin extending from a shell of a USB connector, where the at least one matching network is one-to-one corresponding to the at least one first pin.

In step 1210, a main board including the ground part and at least one conductive part independent of the ground part may be formed.

In step 1230, the at least one first pin is fixed to the at least one conductive part, and the at least one first pin is one-to-one corresponding to the at least one conductive part; the at least one matching network is connected between the at least one conductive part and the ground part, and the at least one matching network is one-to-one corresponding to the at least one conductive part.

According to the embodiment of the present invention, a matching network may be connected between a pin of a USB connector of a wireless communication device and a ground part of a main board, and is configured to control distribution of a surface current excited by an antenna radiation system on the main board of the wireless communication device, so as to control wireless performance of the antenna radiation system, and reduce a difference in wireless performance between different terminal devices having a USB socket, thereby ensuring that the wireless communication device has good wireless performance when accessing different terminal devices, so that a user can have similar experience when using the wireless communication device on different terminal devices.

Optionally, as another embodiment, the method in FIG. 12 further includes: connecting at least one second pin extending from the shell to the ground part.

According to the embodiment of the present invention, the at least one matching network may include at least one lumped-element matching network, or at least one distributed matching network, or a combination of at least one lumped-element matching network and distributed matching network.

According to the embodiment of the present invention, a parameter of the at least one matching network may be determined by measuring wireless performance of an antenna radiation system including the antenna.

One of two pins of a metal shell of the USB connector according to the embodiment of the present invention is not directly connected to a PCB main board, and the pin that is not directly connected to the PCB main board may be any one of the two pins of the metal shell of the USB connector. An isolated conductive part of the main board that is connected to the pin of the USB connector and the ground part of the main board may not be connected, or may be connected by using a matching device that spans between the isolated conductive part and the ground part of the main board. According to the embodiment of the present invention, by adopting a ground manner of connecting a pin of an inline USB connector to the ground part on the main board PCB through the isolated conductive part on the main board and the matching device (or in a direct current disconnect form), the wireless performance of the wireless communication device is improved.

Persons of ordinary skill in the art may be aware that, units and algorithm steps of the examples described in combination with the embodiments disclosed in this specification may be implemented by electronic hardware, or a combination of computer software and electronic hardware. Whether these functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a specific working process of the foregoing system, apparatus, and unit, reference may be made to a corresponding process in the foregoing method embodiments, and details are not repeatedly described here.

In the several embodiments provided in the present application, it should be understood that the disclosed system, apparatus, and method may be implemented in other manners. For example, the apparatus embodiments described in the foregoing are merely exemplary. For example, dividing of the units is merely a kind of logical function dividing, and there may be other dividing manners in actual implementation. For example, multiple units or components may be combined or integrated into another system, or some features may be ignored or not performed. In addition, the shown or discussed mutual couplings or direct couplings or communication connections may be implemented through some interfaces, and indirect couplings or communication connections between the apparatuses or units may be electronic, mechanical or in other forms.

The units described as separate parts may or may not be physically separate, and parts displayed as units may or may not be physical units, may be located in one position, or may also be distributed on multiple network units. A part or all of the units may be selected according to actual needs to achieve the objectives of the solutions of the embodiments.

In addition, functional units in the embodiments of the present invention may be integrated into a processing unit, each of the units may also exist alone physically, and two or more than two units may also be integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device, or the like) to perform all or a part of the steps of the method described in the embodiments of the present invention. The storage medium includes: any medium that is capable of storing program codes, such as a U disk, a removable hard disk, a read-only memory (ROM, Read-Only Memory), a random access memory (RAM, Random Access Memory), a magnetic disk, or an optical disk.

The foregoing description is merely specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A wireless communication device, comprising:
   an antenna;
   a main board, comprising:
     a ground part, wherein the ground part is connected to the antenna;
     a plurality of first conductive parts, wherein the plurality of first conductive parts are independent of the ground part;
   a plurality of matching networks connected to the ground part; and
   a USB connector comprising a shell and a plurality of pins extending from the shell, wherein the plurality of pins are connected to the plurality of matching networks by the plurality of first conductive parts, wherein the plurality of first conductive parts are in a one-to-one correspondence with the plurality of matching networks, and wherein the plurality of pins are in a one-to-one correspondence with the plurality of matching networks.

2. The wireless communication device according to claim 1, wherein the shell is a metal shell, or the shell comprises a second conductive part, configured to electrically connect the a pin of the plurality of pins to an external device.

3. The wireless communication device according to claim 1, wherein an edge of a first conductive part of the plurality of first conductive parts that is adjacent to the ground part and an edge of the ground part that is adjacent to the first conductive part of the plurality of first conductive parts have a rectangle shape or an arc shape.

4. The wireless communication device according to claim 1, wherein the plurality of matching networks comprises a lumped-element matching network or a distributed matching network, wherein the lumped-element matching network is connected to the ground part and a pin of the plurality of pins by adopting a physical connection manner, and the distributed matching network is connected to the ground part and a pin of the plurality of pins by adopting an electrical connection manner.

5. The wireless communication device according to claim 4, wherein the lumped-element matching network comprises a matching circuit formed by at least one of a resistor, a capacitor and an inductor.

6. The wireless communication device according to claim 4, wherein the distributed matching network comprises a capacitor, the capacitor being formed by the a first conductive part of the plurality of first conductive parts, the ground part and a gap between the first conductive part of the plurality of first conductive parts and the ground part.

7. The wireless communication device according to claim 1, wherein a first conductive part of the plurality of first conductive parts is located at a position where a pin of the plurality of pins and the main board overlap, wherein an area of the first conductive part of the plurality of first conductive parts is larger than an overlapped area of the pin of the plurality of pins and the main board, wherein the first conductive part of the plurality of first conductive parts is adjacent to the ground part, and wherein the plurality of matching networks comprises at least two parts that are separated from each other, one end of each part of the at least two parts is connected to one edge of the first conductive part of the plurality of first conductive parts, and the other end is connected to the ground part.

8. The wireless communication device according to claim 1, wherein a parameter of a matching network of the plurality of matching networks is determined by measuring wireless performance of an antenna radiation system comprising the antenna.

9. A wireless communication device, comprising:
- an antenna;
- a main board, comprising a ground part, wherein the ground part is connected to the antenna;
- a matching network connected to the ground part; and
- a USB connector comprising a shell and a first pin extending from the shell, wherein the first pin is connected to the matching network and the first pin is one-to-one corresponding to the matching network;

wherein the main board further comprises a conductive part, wherein the conductive part is independent of the ground part and is configured to connect the first pin to the matching network and wherein the conductive part is one-to-one corresponding to the matching network;

wherein the conductive part is located at a position where the first pin and the main board overlap, wherein an area of the conductive part is larger than an overlapped area of the first pin and the main board, wherein the conductive part is adjacent to the ground part, and wherein the matching network comprises at least two parts that are separated from each other, one end of each part of the at least two parts is connected to one edge of the conductive part, and the other end is connected to the ground part.

10. The wireless communication device according to claim 9, wherein a parameter of the matching network is determined by measuring wireless performance of an antenna radiation system comprising the antenna.

* * * * *